United States Patent [19]
Welmer

[11] Patent Number: 5,815,082
[45] Date of Patent: Sep. 29, 1998

[54] LOCAL COMMUNICATION BUS SYSTEM AND APPARATUSES FOR USE IN SUCH A SYSTEM

[75] Inventor: Harm J. Welmer, Sutton, England

[73] Assignee: DB2 Systems Company Limited, Surrey RH1 1DL, England

[21] Appl. No.: 853,373

[22] Filed: Mar. 18, 1992

[30]     Foreign Application Priority Data

Mar. 22, 1991 [GB]  United Kingdom ................ 9106113.5
Jun. 26, 1991 [GB]  United Kingdom ................ 9113793.5

[51] Int. Cl.⁶ ...................................... H04Q 1/00
[52] U.S. Cl. ...................... 340/825.07; 370/451
[58] Field of Search .............. 340/825.07, 825.63, 340/825.5, 825.51, 825.08, 504, 505, 500, 825.52, 870.03; 370/85.1, 85.8, 241, 245, 247, 251, 252, 257, 364, 450, 449, 451

[56]              References Cited

U.S. PATENT DOCUMENTS 4,716,408  12/1987  O'Connor et al. ................ 340/825.07
4,939,746   7/1990  Children ............................ 455/33.2
4,942,571   7/1990  Moller et al. ...................... 370/85.1
5,054,022  10/1991  Van Steenbrugge .................. 370/438
5,157,658  10/1992  Arai et al. ....................... 340/825.07
5,189,409   2/1993  Okuno .............................. 340/825.63
5,235,619   8/1993  Beyers et al. ....................... 455/5.1

FOREIGN PATENT DOCUMENTS 0315158  5/1989  European Pat. Off. .
0369382  5/1990  European Pat. Off. .
2223114  3/1990  United Kingdom .

OTHER PUBLICATIONS

"Targetted MCU Design For Control Networks", by S. Heath, Electronic Product Design, vol. 12, No. 7, Jul. 1991.

*Primary Examiner*—Dang Ton
*Attorney, Agent, or Firm*—Brian J. Wieghaus

[57]              ABSTRACT

A number of domestic audio/video apparatuses (10–14) are connected to a serial control bus (D2B, 16). Each apparatus is addressable via the bus as a device and contains functional elements addressable on subdevices. One apparatus (14) includes an on-screen display subdevice (41) and a first control subdevice (24). Subdevice status messages are defined whereby a control subdevice can ask to be informed of the status of a further subdevice (e.g. 26), and in particular to be informed automatically of any change in status without the need for continuous polling of subdevices. The subdevice status messages can be used to obtain early confirmation of a signal path being established through the system.

29 Claims, 3 Drawing Sheets

LOCAL COMMUNICATION BUS SYSTEM AND APPARATUSES FOR USE IN SUCH A SYSTEM

BACKGROUND OF THE INVENTION

The invention relates to a local communication bus system comprising a serial control bus connecting a plurality of apparatuses addressable via the bus as devices, each device including at least one functional element addressable via the bus as a subdevice, the subdevices in the system including a control subdevice and a further subdevice, the control subdevice including means for generating a subdevice status request message addressed to the further subdevice in the system, while the further subdevice includes means responsive to the subdevice status request message for returning a subdevice status message to the control subdevice.

The invention further relates to apparatuses for use in such a system, such apparatuses including an interface to a serial control bus and being addressable as a device via said bus, the apparatus further including one or more functional elements addressable via the bus as subdevices.

A known serial control bus for interconnecting domestic audio and video apparatuses is the Domestic Digital Bus (D2B) standardised by the International Electrotechnical Commission (IEC). An apparatus including D2B interface and on screen display (OSD) of status information is available in the United Kingdom in the form of Philips' model 2070 color television receiver. In order to allow status information to be gathered for control purposes or for user information, numerous specific request messages are recognized by the subdevices in the known apparatus, which respond with the current value of a specified status variable (channel number, volume setting, active/standby etc.). The known apparatus also implements protocols for the automatic establishment of paths for user information signals (audio, video and the like), based on a method known from GB-2 223 114-A (PHN12678).

A problem that arises in obtaining status information in the known apparatus is that status can change in response to a variety of events. For example, a tape deck in a fast wind or play mode will stop when the end of the tape is reached. While the known bus system allows status to be monitored by polling of devices and subdevices with frequent request messages, the amount of bus traffic (requests and replies) involved in such polling renders it impractical for widespread use in a system of more than a very few subdevices.

SUMMARY OF THE INVENTION

It is an object of the invention to enable improved performance in a system as set forth in the opening paragraph.

The invention provides a local communication bus system as set forth in the opening paragraph, characterized in that the further subdevice includes means responsive to a change in status within the further subdevice for returning an updated subdevice status message to the control subdevice without the need for a further subdevice status request.

The further subdevice might be in any apparatus of the system so that, for example, a control subdevice in television set could inform the user, by means of on-screen display, not only that it is displaying a picture received from a separate satellite broadcast tuner, but also which channel is selected in the tuner. In order that such information is always up-to-date, updated subdevice status messages may be made available automatically in response to changes in status, and these in turn can be used to trigger the automatic composition of an updated user message by the control subdevice. The subdevice status request message may include a field specifying whether or not updated subdevice status messages are desired.

Since the further subdevice must remember the address of the control subdevice which has requested updated messages, and since more requests might be outstanding at a given time than the further subdevice has room to remember, it is advantageous if the control subdevice includes means for generating a verification request addressed to the further subdevice, the further subdevice being responsive to the verification request message to generate a message advising whether updated user messages will be generated.

The status of the further subdevice may comprise a plurality of specific status variables, the said subdevice status request message being a generic subdevice status request message, not specific to any one of the specific status variables, the updated subdevice status message being transmitted automatically in response to a change in any one of the subdevice status variables of the further subdevice. This reduces the memory and processing required in the further subdevice for recording outstanding status requests. The generic status message may recite the current value of every status variable in turn, in which case the control subdevice will have to select the information it requires from the stream of values.

Alternatively, the generic status message may contain only a subset of the status values, or even none of them. In such a case, the desired status information can be obtained if the further subdevice includes means for recognising each of a plurality of specific status request messages received from the control subdevice and is responsive to each such specific status request message to return the current value of a respective one of the status variables, in a specific subdevice status message, but without the facility for updated specific subdevice status messages. The combination of automatic updates for the generic status messages and 'once-only' messages for specific status values represents an efficient compromise within the cost and compatibility constraints relevant to consumer apparatus.

There are many applications of these subdevice status facilities beyond the provision of user messages. Where, for example, a status variable specifies the connectivity of at least part of a user information signal path as far as it lies within the device in which the further subdevice is located, a request for updated subdevice messages can result in early confirmation of the establishment of a signal path through the system, compared with the known method.

The invention further provides an apparatus for use in a system embodying the invention as set forth above, the apparatus including an interface to a serial control bus and at least one functional element addressable as and having the technical features of the further subdevice of the system. The invention still further provides an apparatus for use in such a system embodying the invention as set forth above, the apparatus including an interface to a serial control bus and at least one functional element, the functional element being addressable as and having the technical features of the control subdevice of the system.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
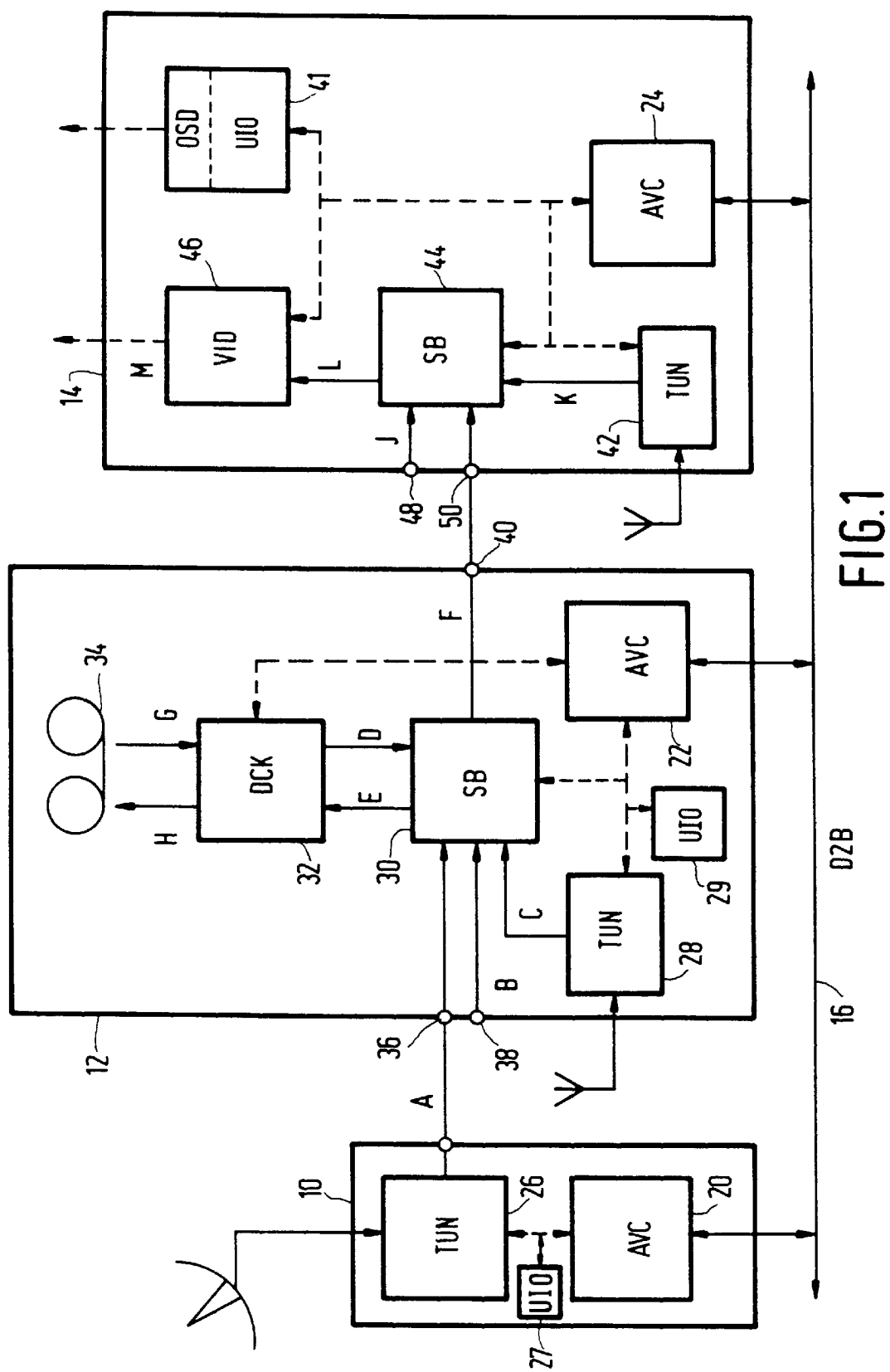
FIG. 1 shows audio/video entertainment apparatuses forming a local bus communication system constructed in accordance with the invention.

FIG. 1 shows a domestic video entertainment system comprising a satellite broadcast tuner 10, a video cassette recorder (VCR) 12 and a television receiver 14, all connected to a serial data bus 16. Video and audio signals are passed within and between the devices 10,12,14 using, for example, SCART (Euroconnector) plugs, sockets and multiwire cables.

The serial data bus is in this embodiment a Domestic Digital Bus (D2B) as standardised by the International Electrotechnical Commission (IEC), Geneva, to be published in their document 1030 and previously available in draft form. D2B provides for distributed control of the bus, and allows commands and other messages to be uniquely addressed for specific "devices", such as the apparatuses 10,12 and 14, and also for specific "subdevices" within each device.

Within each device 10,12,14 there are shown blocks representing D2B subdevices. The division of a device into subdevices is necessary only in a logical sense, that is to say, from the point of view of its behaviour relative to the serial bus 16. In the physical implementation of the device, there may or may not be corresponding separate physical subdevices. In fact, in the embodiment shown, each device includes one audio/video controller (AVC) type of subdevice which provides the control and systematic interrogation intelligence for all subdevices within that device, relaying D2B messages to and from those subdevices as indicated by the dotted data paths in FIG. 1. The AVC subdevices also provide the (distributed) controlling logic of the system as a whole, interpreting user commands and controlling the operation of the system accordingly. Often, the control logic of the AVC and some or all of the other subdevices will be integrated using a single programmed microcontroller. Other subdevices not shown in FIG. 1 will generally be included in such a system, including timers, audio amplifiers, and so forth, and the video-related subdevices described herein are presented as a representative sample only.

In the satellite tuner device 10, a tuner subdevice 26 (TUN) performs the signal processing functions necessary to provide baseband video signals on a signal path A, while the AVC subdevice 20 receives user instructions from a user input/output subdevice 27 (UIO) and D2B messages from the bus 16, and operates to select channels, keep track of preset channel selections and so forth.

The VCR device 12 includes its AVC subdevice 22, and also a user input/output subdevice 29 (UIO), or terrestrial broadcast tuner subdevice 28 (TUN), a switchbox subdevice 30 (SB) and a videotape record/replay deck 32 (DCK). The recording medium itself is indicated at 34. The signal path A is connected via a first external (SCART) connector 36 of VCR device 12 to an input of the VCR's switchbox subdevice 30. A second external connector 38 of the VCR device is also connected via a signal path B to the switchbox subdevice 30, for example to allow connection of a videodisc player, or a second VCR. The terrestrial tuner subdevice 28 supplies a video signal to the switchbox 30 via a signal path C, and the deck subdevice 32 supplies a video signal to the switchbox 30 via a signal path D. The switchbox 30 supplies video signals via a signal path E to the deck 32 and via a signal path F to a third external connector 40 of the VCR device 12. The processes of reading and writing signals on the tape 34, within the deck subdevice 32, are schematically represented by video signal paths G and H respectively.

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The television receiver device 14 has two external (SCART) connectors 48 and 50 for supplying video signals to the switchbox 44. The connector 48 forms part of an unused video signal path J, while the connector 50 is connected to the third external connector 40 of the VCR device 12, and thus the video signal path F extends from an output of the switchbox 30 in the VCR to an input of the switchbox 44 in the television receiver device 14. A video signal output of the tuner subdevice 42 is connected to further input of the switchbox 44 to form a signal path K. A first video signal output of the switchbox 44 is connected to an input of the video monitor subdevice 46 (signal path L). The UIO subdevice 41 of the television receiver includes an on-screen display (OSD) function, as described hereinafter.

In operation, the tuner subdevices 26,28 and 42 can be regarded as sources of video signals with in the system. The video monitor subdevice 46 can act as a destination for video signals, and functions to display images to the user, as indicated by the dotted output path M. The record/replay deck subdevice 32 can act as a source and/or a destination of video signals, depending whether it is playing and/or recording at a given time.

Since the functional elements within the apparatuses 10,12,14 are addressable as D2B subdevices, any of the AVC subdevices 20,22,24 can take control of the bus and address commands to those subdevices. This is done for example by an AVC subdevice which has been informed of a user command by a UIO subdevice and requires control of subdevices at various points in the system to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 30 and 44 can be controlled via the bus (or by its associated AVC subdevice) to connect its output data paths (s) a specified one of its input data paths. For example, if a user indicates to the television receiver device 14 that it is desired to watch a certain satellite broadcast channel, suitably addressed and coded D2B messages can be sent via the bus 16 to ensure that the satellite tuner 10, VCR 12 and the television 14 are active, to cause the satellite tuner 10 to select the appropriate channel, to cause the VCR switchbox subdevice 30 to connect signal path A to signal path F, and to cause the television switchbox subdevice 44 to connect signal path F to signal path L. There are many ways of arranging these events with or without user intervention. For greatest user-friendliness, the whole process can be controlled by the AVC subdevice of the device which receives the user input. The information necessary for building the signal path from A to L can be obtained by a suitable series of D2B request messages to the relevant devices and subdevices. A suitable system for providing such control is described in GB-2 223 114-A1 (PHN 12678). In that system no AVC subdevice requires knowledge of the complete system, only its nearest neighbours.

In order to provide a user-friendly user interface for the system any AVC subdevice (hereinafter "AVC") may wish to display user messages using the on-screen display (OSD) facility of the UIO subdevice 41. For example, when the television is activated by a user and a signal path set up according to the user's wishes, the AVC 24 may wish to conform visually for the user which channel is being watched. If the signal comes from the satellite tuner 10, a conventional on-screen display would be able to confirm no more than the fact that the signal is coming from the second external connector 50. To allow the displayed information to include the actual channel name, known only within AVC 20, a device information process is set up, with the AVC 24 acting as the initiating AVC and AVC 20 acting as an addressed AVC.

More than one device information process can be pending at one time, each process involving just one initiating AVC and one or more addressed AVCs. Each AVC can be involved in a number of device information processes, acting as initiating AVC in some and addressed AVC in others.

To implement the device information facility, the following D2B requests and commands are defined for use by an initiating AVC in the system of FIG. 1:

[Character-Sets?] request causes the addressed AVC to reply with a parameter [charset] or list of parameters identifying the supported character sets by reference to a list of standard sets;

[Device Information Format?] request causes the addressed AVC to reply with a list of format definitions [format] specifying the height and width (in characters) of the user messages that the addressed AVC can compose;

[Monitor Device Status] command instructs the addressed AVC to compose a user message and has parameters [format] and [charset] to specify the format of the desired user message, and also a control parameter which may be [once], [on] or [off]; and

[Monitoring Device Status?] request causes the addressed AVC to reply [on] or [off], as described below.

For all the above requests, a reply [Not Implemented] from the addressed AVC indicates that a device information facility is not implemented by that AVC.

If the control parameter in the [Monitor Device Status] command is [once], this indicates that only one user message indicating current status is desired, whereas the value [on] indicates that an updated user message is desired in response to each status change until the command is issued again with the control parameter [off].

For the addressed AVC, the command [Device Information] is defined, with parameters [format], [charset] and [text] which can be sent to the initiating AVC, and includes the user message in the parameter [text]. This is implemented as a command message, rather than a reply to a request, in order that the addressed AVC can volunteer user messages spontaneously in response to subsequent status changes.

The [Monitoring Device Status?] request is used to find out if an addressed AVC will be returning a user message to the initiating AVC: [on] if so, [off] if not. It should be noted that the answer [off] may be received though a command [Monitor Device Status] [on] has recently been given to the addressed AVC. This is because the addressed AVC has to keep a record of every initiating AVC that awaits an updated user message, for example by storing in a table the device-subdevice address of each initiating AVC. If that table becomes full, no further device information processes can use the addressed AVC. The table entry is deleted when the command [Monitor Device Status] [off] is received from the corresponding initiating AVC. It is also desirable that the addressed AVC should delete a table entry if the initiating AVC should become inactive, for example due to an apparatus in the system being switched off.

Figure 2:
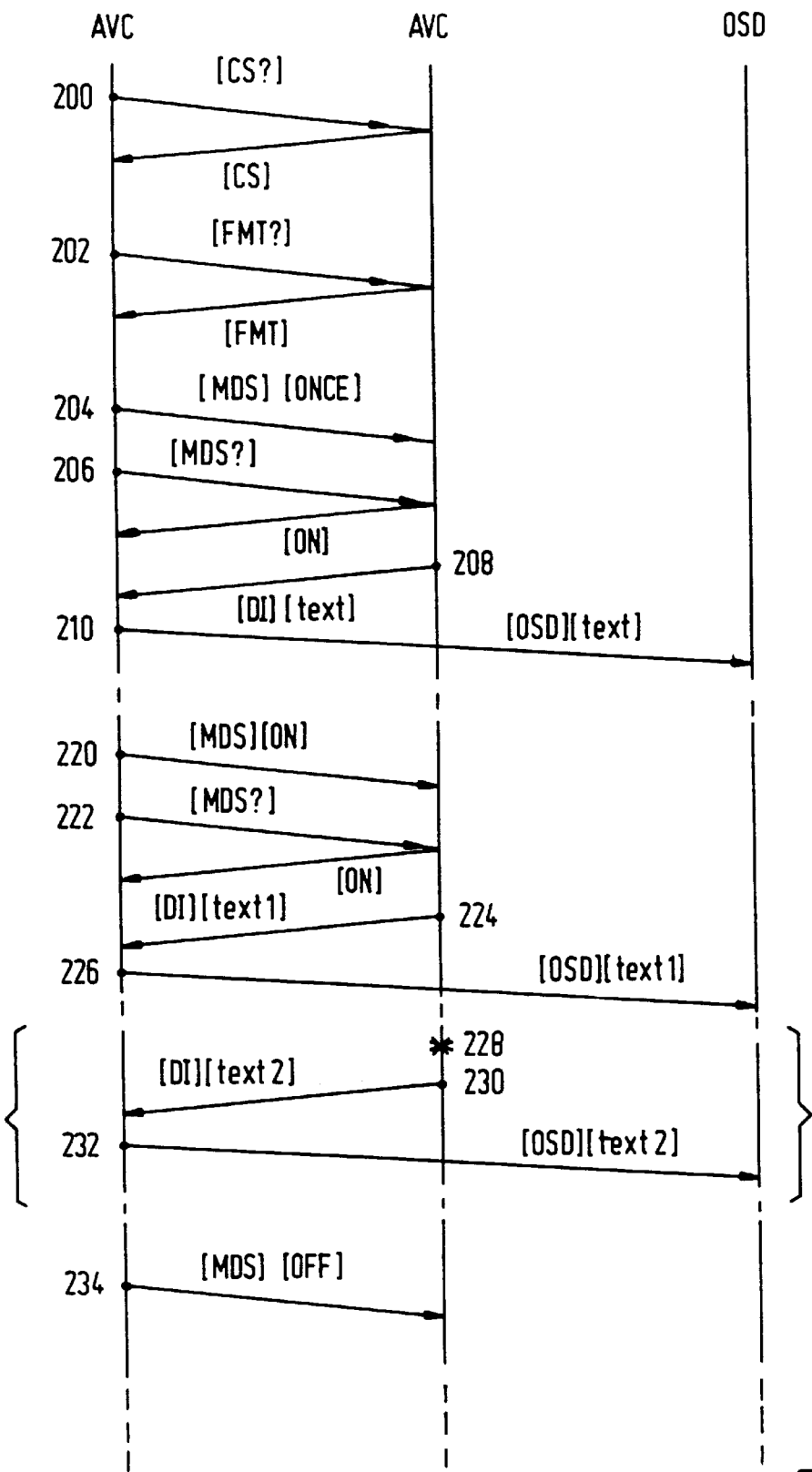
FIG. 2 illustrates operation of the system providing on-screen display of status information.

FIG. 2 illustrates a typical sequence of messages being exchanged between a single initiating AVC at the left hand side, an addressed AVC in the middle and an OSD subdevice at the right hand side. The three vertical lines represent the parallel actions of each of these subdevices respectively, with time increasing from top to bottom. Interactions in the form of D2B messages are represented by arrows directed from one of these lines to another.

200 the initiating AVC asks the available character sets, and the addressed AVC replies with a single value [charset];

202 The initiating AVC asks the available formats, and the addressed AVC replies with a single format parameter [format], for example "4 lines of 16 characters";

204 the initiating AVC issues the command [Monitor Device Status] [once] [format] [charset], and the addressed AVC stores the address of the initiating AVC and begins to prepare the user message in that format;

206 the initiating AVC asks if monitoring is in progress, the addressed AVC replies [on];

208 the composed user message [text], including the exact number of characters dictated by [format], is sent to the initiating AVC with a [Device Information] command and the stored address of the initiating AVC is 'forgotten';

210 the initiating AVC sends the user message [text] to the OSD subdevice for display;

Steps 220 to 234 relate to a subsequent request for updated user messages;

220 the initiating AVC issues the command [Monitor Device Status] [on] [format] [charset], indicating that updated user messages are desired, and specifying the text size and character set to be used (available character set and text size are already known from 200,202); the addressed AVC stores the address of the initiating AVC and begins to prepare a first user message;

222 the initiating AVC confirms with a [Monitoring Device Status?] request that the addressed AVC is able to produce the requested message (reply=[on]);

224 the first user message [text1] is sent to the initiating AVC with a [Device Information] command;

226 the initiating AVC sends the user message [text1] to the OSD subdevice for display with a command [OSD];

228 the addressed AVC detects a change in status and begins preparing an updated user message;

230 the updated user message [text2] is sent to the initiating AVC with a [Device Information] command;

232 the updated user message is sent to the OSD subdevice for display, steps 228–232 occurring in response to each status change so long as the device information process is active;

234 the initiating AVC sends the command [Monitor Device Status] [off], the addressed AVC forgets the stored address of the initiating AVC so that no further updated user messages are supplied for display.

It is of major benefit that the initiating AVC does not need to specify or interpret the content of the user message, and therefore one apparatus does not need to know (that is, acquire and store) a large amount of information about another apparatus in order to initiate the display of user messages. Furthermore, the style and content of the user messages are, within a restricted format, entirely at the choice of the designers of the addressed device. Therefore freedom to design more user-friendly products, and products which express a 'personality' characteristic of a given manufacturer, is not greatly restricted by the need for compatibility of products between manufacturers.

To allow the addressed AVC (or any other AVC) to generate a user message that reflects status information for a subdevice located anywhere in the system, in particular in a different device, requests and commands are also defined relating to the status of an addressed subdevice. For example, it will be more helpful to the user if the VCR device 12 can generate a user message saying "Recording Superchannel", rather than merely "Recording from external connector". To allow this, a command [Monitor Subdevice Status] is defined for the addressed AVC to send to a further subdevice, with parameter [on] or [off]. This has an effect on the further subdevice similar to that of the [Monitor Device Status] command for the addressed AVC, except that the reply [Subdevice Status] from the subdevice comprises status information in a coded form understandable by the AVC, rather than being a natural language text message for the user.

Upon receipt of the command [Monitor Subdevice Status] [on], then, the further subdevice stores the device-subdevice address of the addressed AVC and begins to construct the first message [Subdevice Status]. So long as the address of the addressed AVC remains stored in the further subdevice, the latter will send an updated [Subdevice Status] message to that AVC in response to any change in status within the subdevice (for example, a change of channel, a new volume setting, end of tape and so forth). If the further subdevice has room to store more than one AVC address for this purpose, then each such AVC will be sent a [Subdevice Status] message in response to each status change. Thus, the event which triggers an update of the on-screen display at 228 in the sequence of FIG. 2 might be the receipt by the addressed AVC of an updated [Subdevice Status] message from a further subdevice (not illustrated in FIG. 2).

The further subdevice will forget a stored AVC address when it receives the command [Monitor Subdevice Status] [off] from that AVC, or if it becomes impossible to send subdevice status information to that AVC, for example because the latter has been switched off, or disconnected from the bus.

The [Subdevice Status] message always conveys the same set of information. In the present embodiment the AVC is not permitted to specify a subset of updated [subdevice status] messages to be sent at a given time, since that would increase the processing and storage abilities demanded of every further subdevice.

Specific requests are defined however, for the individual properties of the subdevice, for example to find out the brightness or contrast setting of the video monitor subdevice 46, the preset tuning setting of the tuner subdevice 26, 28 or 42. If the updated [Subdevice Status] message does not itself contain a required piece of information, it can at least serve as a prompt to an AVC to ask for that specific property. Once again, the system described has benefits in that the responsibility for determining the content and style of the user messages or other control feature can be concentrated within one AVC, and not distributed among the subdevices of several apparatuses, so as to force restrictive compatibility requirements on different apparatus manufacturers.

It will be appreciated that the subdevice status facilities can be used by an AVC to obtain information for control purposes not necessarily connected with the provision of user-readable messages. For example, if a user wishes to play from the beginning of a tape loaded in the deck subdevice 32 of the VCR 12, an AVC (22 etc.) can issue a REWIND command to the deck subdevice, together with a subdevice status request. When the tape is fully rewound, this will trigger an updated subdevice status message to the AVC, which can then issue a PLAY command without further user intervention.

As another example, the subdevice status facilities can be used to speed up the known method of establishing a desired video user information signal path (for example a video signal path) through the network of apparatuses and cables, which method is described in GB-2 223 114-A1, mentioned above. In that known method, the source and destination subdevices need not be aware of their ultimate connection to each other, nor of the exact path followed by the signals in between. Rather, each subdevice knows only of its connections to the external plugs or other subdevices of the device in which it is located, and each device is aware of its connections to neighbouring devices. Therefore the source and destination subdevices and intervening switchbox subdevices have delegated to them respective stages in the establishment of the desired signal path. In a distributed, autonomous process, each subdevice in turn commands its neighbour to establish a connection to the destination, and periodically requests confirmation from that neighbour of failure or success. Thus establishing a signal path involves the step-by-step propagation of processing and commands from source to destination through a chain of interconnected neighbour apparatuses, followed by a step-by-step propagation of confirmation messages in the reverse direction until finally the connection exists between source and destination.

A subdevice's current status includes information on its local connectivity within the same device. Therefore, when a destination subdevice receives notice of its connection as part of a newly established signal path to a source of user information signals, its status changes, and an updated [Subdevice Status] message can be triggered.

Figure 3:
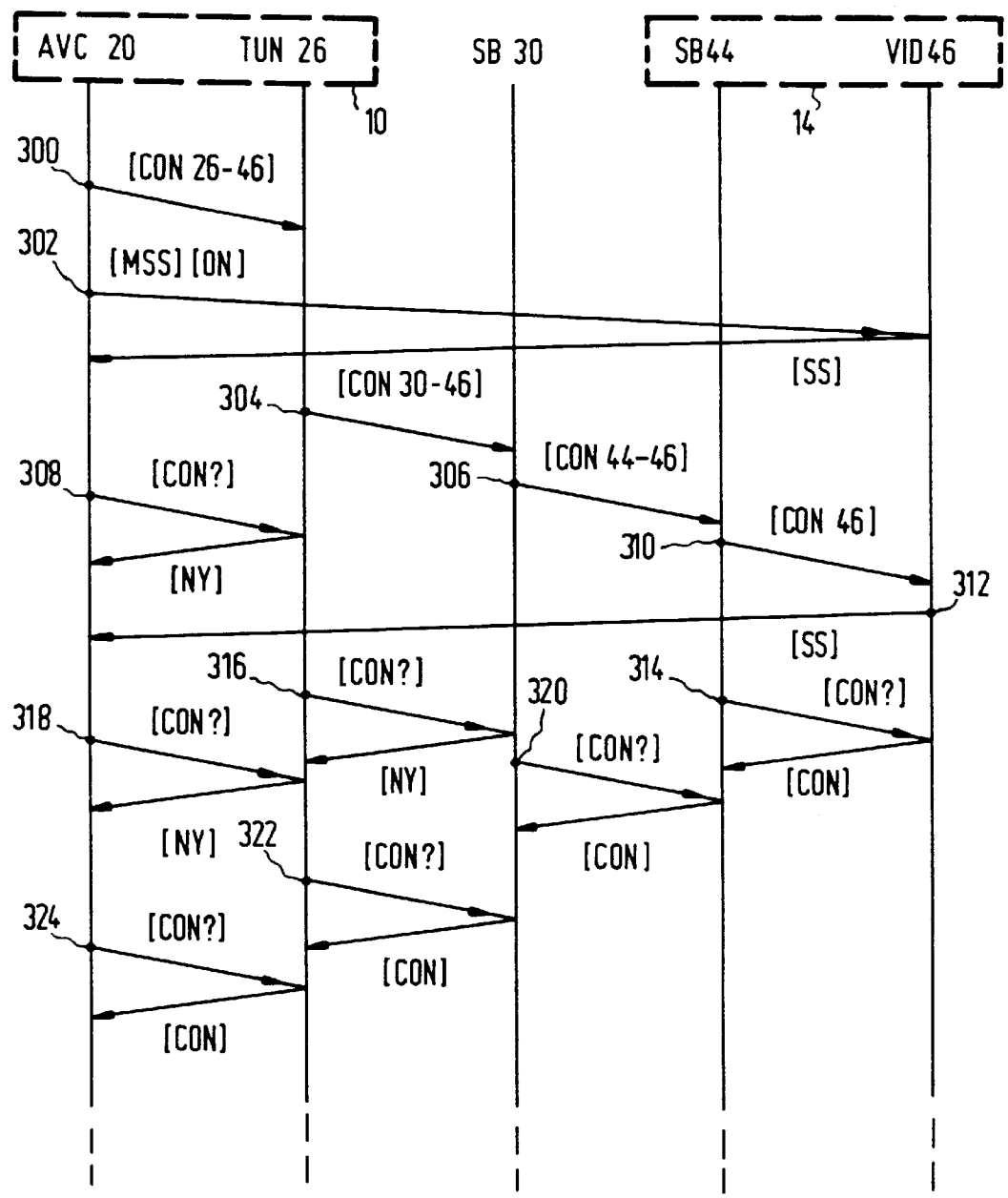
FIG. 3 illustrates operation of the system establishing a signal path using subdevice status facilities in accordance with the invention.

FIG. 3 illustrates the operation of a modified version of the method known from GB-2 223 114-A1, in which the subdevice status facility is used to obtain an early confirmation of a successful connection. The example process of FIG. 3 has as its object the establishment of a video signal path from satellite tuner subdevice 26 (source) to the video monitor subdevice 46 (destination). Five subdevices 20,26, 30,44 and 46 of the system are involved in the process, the actions of each being again represented along respective vertical lines, as in FIG. 2. Dotted boxes indicate that in fact subdevice pair 20,26 and subdevice pair 44,46 are contained within respective devices 10 and 14. Accordingly, although interactions within each of these pairs are modelled and illustrated as D2B messages, in practice these are internal to a single apparatus and can be effected in any manner, without use of the physical bus 16.

The interactions are numbered 300 to 324, and are explained in sequence below. All the steps except 302 and 312 are those which would occur in accordance with the known method.

300 Having been informed via user I/O subdevice 27 that the user wishes to display a satellite video signal on the screen of television set 14, the AVC 20 of satellite tuner 10 identifies the source and destination subdevices 26 and 46 respectively and issues a connect command [CON 26 46] requesting source subdevice 26 to build a signal path to the destination. Although the reference signs 26 and 46 appear in the representation of this command in FIG. 3, it will be understood that in practice subdevices are referred to by their unique D2B addresses. This initiates an autonomous process of interactions in the known manner.

302 In parallel with the known process, AVC 20 issues a [Monitor Subdevice Status] [ON] command to the destination subdevice 46.

304 Having determined that it does not have a direct connection to the destination subdevice 46, but being aware of signal path A, the tuner subdevice 26 commands its neighbour, the VCR switchbox subdevice 30 to build a signal path to the destination.

306 Having determined that it too is not directly connected to the destination subdevice 46, switchbox subdevice 30 commands television switchbox subdevice 44 to connect it to the destination.

308 In the meantime, AVC 20 issues a request [CON?] to source subdevice 26 for confirmation of the requested connection, to which the reply [NY] signifies 'not yet'.

310 The switchbox subdevice 44 requests connection to the input of destination subdevice 46. This is not guaranteed, since the subdevice 46 may be displaying already a signal from another source with a higher priority.

312 Assuming no such priority bar exists, the video monitor subdevice 46 is then aware that it is being connected through switchbox subdevice 44 to an external source of video signals. This constitutes a change of subdevice status and a [Subdevice Status] message is sent to the AVC 20 in response to the earlier command (302). Thus the AVC 20 has immediate confirmation that the signal path has been identified successfully.

314 The switchbox 44 requests confirmation of connection to the destination subdevice 46, which is received with an affirmative reply [CON]. The switchbox sets its switches to connect path L to path F.

316,318 Source subdevice 26 and AVC 20 request confirmation of connections and both receive 'not yet' for an answer.

320 Switchbox subdevice 30 requests and receives confirmation of connection to the destination, and sets its switches to connect path F to path A.

322 Source subdevice 26 requests and receives confirmation of its connection to the destination.

324 AVC 20 requests and receives final confirmation of the signal path having been established.

In accordance with the known method, AVC 20 would have to wait until step 324 for any confirmation of the progress of the establishment of the signal path. In the method of FIG. 3, however, advance confirmation is provided by the [Subdevice Status] message at 312, so that the AVC 20 can begin issuing channel selection commands, user messages and so on as soon as possible.

Moreover, this confirmation is received without excessive polling by [CON?] requests, and more quickly than would be possible by such polling. The frequency of requests such as those at 308, 316 and 318 could therefore be reduced, although [CON?] requests 320,322 are required for final confirmation that the connection has been made.

From reading the present disclosure, other variations and applications will be apparent to persons skilled in the art. Such variations may involve other features which are already known in the design, manufacture and use of local communication bus systems, audio/video apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A local communication bus system comprising a serial control bus coupled to a plurality of devices, each device comprising a control subdevice and a further subdevice, each device, control subdevice and further subdevice being addressable using said serial control bus, wherein said control subdevice comprises means for generating a first status request message addressed to said further subdevice, and wherein said further subdevice comprises:

a) means responsive to said first status request message for generating a first further subdevice status message to said control subdevice; and b) means responsive to a change in status in said further subdevice for generating an updated further subdevice status message to said control subdevice without receiving an additional status request message from said control subdevice, if and only if said further subdevice has previously received said first status request message.

2. The system of claim 1, wherein said first status request message comprises a field indicating the desirability of said updated further subdevice status message.

3. The system of claim 1, wherein said control subdevice comprises means for generating a verification request message addressed to said further subdevice, said further subdevice being responsive to said verification request message so as to generate an indication message indicating if said updated further subdevice status message will be generated.

4. The system of claim 1, wherein said first further subdevice status message comprises a plurality of status variables and said first status request message is a status request message which is not specific to one of said status variables, and wherein said updated further subdevice status message is transmitted automatically in response to a change in one of said status variables.

5. A device, including:
   a control subdevice and a further subdevice, said control subdevice including facilities for sending a status request message indicating receptiveness of said control subdevice to status update messages from said further subdevice; and,
   further subdevice facilities responsive to a change in status of said further subdevice for automatically generating a status update message, without the necessity of receiving an additional status request message from said control subdevice, and for automatically sending a further status update message to said control subdevice if, and only if, said further subdevice has previously received said status request message from said control subdevice.

6. The device as set forth in claim 5, wherein a first type of said status request message identifies a plurality of device status variables for which status updating is requested.

7. The device as set forth in claim 6, wherein a second type of said status request message identifies a selected subset of said plurality of device status variables for which status updating is requested.

8. The device as set forth in claim 6, wherein said further subdevice facilities are responsive only to a change in status of any one or more of said plurality of device status variables for generating said status update message.

9. The device as set forth in claim 7, wherein said further subdevice facilities are responsive only to a change in status of anyone or more of said subset of said plurality of device status variables for generating said status update message.

10. The device as set forth in claim 5, wherein the device comprises a television.

11. The device as set forth in claim 5, wherein the device comprises a VCR.

12. The device as set forth in claim 5, wherein the device comprises a satellite broadcast tuner.

13. The device as set forth in claim 10, wherein:

said control subdevice comprises an audio/video controller, and, said further subdevice comprises a tuner subdevice.

14. The device as set forth in claim 11, wherein:

said control subdevice comprises an audio/video controller; and, said further subdevice comprises a videotape record/replay deck.

15. The device as set forth in claim 12, wherein:

said control subdevice comprises an audio/video controller; and, said further subdevice comprises a tuner subdevice.

16. The device as set forth in claim 6, wherein one of said device status variables is volume setting of the device.

17. The device as set forth in claim 6, wherein one of said device status variables is channel setting of the device.

18. A device, including:

a control subdevice and a plurality of further subdevices, said control subdevice including facilities for sending a status request message indicating readiness of said control subdevice to receive status update messages from said further subdevices; and, wherein each of said further subdevices includes a communication facility responsive to a change in status of its respective further subdevice for automatically generating a status update message, without the necessity of receiving an additional status request message from said control subdevice, and for automatically sending a further status update message to said control subdevice if, and only if, its respective further subdevice has previously received said status request message from said control subdevice.

19. The device as set forth in claim 18, wherein said communication facility of each said further subdevice is responsive to a change in status of its respective further subdevice for automatically sending said further status update message to only said control subdevice.

20. The device as set forth in claim 18, wherein:

the device is coupled to a local communication bus system to which a plurality of other devices are also coupled, said local communication bus system including a serial control bus; and, said control device and each of said further subdevices is addressable via said serial control bus.

21. The device as set forth in claim 19, wherein:

the device is coupled to a local communication bus system to which a plurality of other devices are also coupled, said local communication bus system including a serial control bus; and, said control device and each of said further subdevices is addressable via said serial control bus.

22. The device as set forth in claim 5, wherein:

the device is coupled to a local communication bus system to which a plurality of other devices are also coupled, said local communication bus system including a serial control bus; and, said control device and each of said further subdevices is addressable via said serial control bus.

23. The device as set forth in claim 6, wherein:

the device is coupled to a local communication bus system to which a plurality of other devices are also coupled, said local communication bus system including a serial control bus; and, said control device and each of said further subdevices is addressable via said serial control bus.

24. The device as set forth in claim 7, wherein:

the device is coupled to a local communication bus system to which a plurality of other devices are also coupled, said local communication bus system including a serial control bus; and, said control device and each of said further subdevices is addressable via said serial control bus.

25. The device as set forth in claim 8, wherein:

the device is coupled to a local communication bus system to which a plurality of other devices are also coupled, said local communication bus system including a serial control bus; and, said control device and each of said further subdevices is addressable via said serial control bus.

26. The device as set forth in claim 9, wherein:

the device is coupled to a local communication bus system to which a plurality of other devices are also coupled, said local communication bus system including a serial control bus; and, said control device and each of said further subdevices is addressable via said serial control bus.

27. The device as set forth in claim 16, wherein:

the device is coupled to a local communication bus system to which a plurality of other devices are also coupled, said local communication bus system including a serial control bus; and, said control device and each of said further subdevices is addressable via said serial control bus.

28. The device as set forth in claim 11, wherein:

the device is coupled to a local communication bus system to which a plurality of other devices are also coupled, said local communication bus system including a serial control bus; and, said control device and each of said further subdevices is addressable via said serial control bus.

29. The device as set forth in claim 12, wherein:

the device is coupled to a local communication bus system to which a plurality of other devices are also coupled, said local communication bus system including a serial control bus; and, said control device and each of said further subdevices is addressable via said serial control bus.

* * * * *